US010851537B2

United States Patent
Zhang et al.

(10) Patent No.: US 10,851,537 B2
(45) Date of Patent: Dec. 1, 2020

(54) ASSEMBLABLE STRUCTURAL COLUMN JOINT CONNECTION USING FIBER-REINFORCED CONCRETE FILLED ROUND DOUBLE STEEL TUBES AND MOUNTING METHOD THEREOF

(71) Applicant: Chunwei Zhang, Shandong (CN)

(72) Inventors: Chunwei Zhang, Shandong (CN); Li Sun, Shandong (CN)

(73) Assignee: Chunwei Zhang, Qingdao (CN)

( * ) Notice: Subject to any disclaimer, the term of this patent is extended or adjusted under 35 U.S.C. 154(b) by 0 days.

(21) Appl. No.: 16/416,192

(22) Filed: May 18, 2019

(65) Prior Publication Data

US 2019/0271144 A1 Sep. 5, 2019

Related U.S. Application Data

(63) Continuation of application No. PCT/CN2017/081968, filed on Apr. 26, 2017.

(30) Foreign Application Priority Data

Feb. 23, 2017 (CN) .......................... 2017 1 0100604

(51) Int. Cl.
*E04B 1/21* (2006.01)
*E04B 1/30* (2006.01)
(Continued)

(52) U.S. Cl.
CPC .............. *E04B 1/215* (2013.01); *E04B 1/185* (2013.01); *E04B 1/30* (2013.01); *E04C 3/32* (2013.01);
(Continued)

(58) Field of Classification Search
CPC ..... Y10T 403/32114; Y10T 403/32975; Y10T 403/32229; Y10T 403/32401;
(Continued)

(56) References Cited

U.S. PATENT DOCUMENTS 2,936,184 A * 5/1960 Epstein ................. F16L 37/252
285/81
3,698,564 A * 10/1972 Muller ................. A47B 96/145
211/119.003
(Continued)

FOREIGN PATENT DOCUMENTS

CN 103321301 A 9/2013
CN 104100010 A 10/2014
(Continued)

*Primary Examiner* — Ryan D Kwiecinski
*Assistant Examiner* — Matthew J Gitlin
(74) *Attorney, Agent, or Firm* — Wayne & Ken, LLC; Tony Hom

(57) ABSTRACT

An assemblable structural column joint connection using fiber-reinforced concrete filled round double steel tubes, including an outer high-strength round steel tube, an inner high-strength round steel tube and a round separation plate. The wedge-shaped teeth are provided at two sides of the outer and inner high-strength steel tubes, and wedge-shaped teeth spaced are uniformly distributed along circumferences of the inner and outer high-strength round steel tubes. The round separation plate includes a round plate provided with a central through-hole, and vertical separation walls are provided with on upper and lower surfaces of the round plate. The vertical separation walls are provided with wedge-shaped sliding grooves matching the wedge-shaped teeth. The inner and outer high-strength round steel tubes are fixedly connected to the round separation plate by matching the wedge-shaped teeth with the wedge-shaped sliding grooves.

6 Claims, 7 Drawing Sheets

(51) Int. Cl.
*E04B 1/18* (2006.01)
*E04C 3/32* (2006.01)
*F16B 7/04* (2006.01)
*F16L 39/00* (2006.01)

(52) U.S. Cl.
CPC ........... *F16B 7/0406* (2013.01); *F16L 39/005* (2013.01); *Y10T 403/5733* (2015.01)

(58) Field of Classification Search
CPC ......... Y10T 403/5733; E04B 2001/266; E04B 2001/2668; E04B 2001/2409; E04B 2001/2412; E04B 1/215; E04B 1/30; E04B 1/185; E04B 2001/2478; E04B 2001/2448; E04B 2001/2415; E04B 1/2403; E04C 3/32; E04C 3/34; E04C 5/07; F16L 39/005; F16L 37/113; F16L 37/252; F16B 7/0406; F16B 7/0413
USPC ........ 403/381, 66, 80, 379.4, 379.5; 52/704, 52/708, 223.4, 223.5, 745.17
See application file for complete search history.

(56) References Cited

U.S. PATENT DOCUMENTS

| | | | | |
|---|---|---|---|---|
| 4,024,686 A * | 5/1977 | Gronert | ................... | E04B 1/185 52/761 |
| 4,419,026 A * | 12/1983 | Leto | ...................... | F16B 7/1427 403/104 |
| 4,518,277 A * | 5/1985 | Bush | ....................... | B64G 1/641 403/102 |
| 4,722,156 A * | 2/1988 | Sato | .......................... | E04C 3/34 52/98 |
| 5,145,276 A * | 9/1992 | Demange | .................. | F16B 7/20 285/360 |
| 2003/0175075 A1 * | 9/2003 | Garrison | .............. | B23Q 1/0063 403/381 |
| 2004/0074204 A1 * | 4/2004 | McKinnon | ................ | E04C 3/32 52/781 |
| 2005/0229532 A1 * | 10/2005 | Teng | ........................ | E04C 3/34 52/834 |
| 2007/0209314 A1 * | 9/2007 | Vaughn | .................... | E04C 3/32 52/838 |
| 2007/0246227 A1 * | 10/2007 | Ezell | ....................... | E21B 33/12 166/387 |
| 2008/0250752 A1 * | 10/2008 | Bowman | .................. | E04C 3/32 52/848 |
| 2009/0022545 A1 * | 1/2009 | Koivunen | ................. | E04C 3/34 403/379.4 |
| 2009/0025304 A1 * | 1/2009 | Irniger et al. | ........... | E04H 12/16 52/40 |
| 2009/0169393 A1 * | 7/2009 | Bagepalli | ................ | F03D 13/20 416/248 |
| 2010/0307097 A1 * | 12/2010 | Word, III | .............. | E04H 12/085 52/651.07 |
| 2013/0017899 A1 * | 1/2013 | Foster | .................... | A63B 53/02 473/288 |
| 2013/0205707 A1 * | 8/2013 | Han | .......................... | E04B 1/34 52/699 |
| 2014/0053500 A1 * | 2/2014 | Lassiter | ................... | E04H 12/20 52/831 |
| 2014/0059964 A1 * | 3/2014 | Johnston | ............... | E04H 12/085 52/514 |
| 2014/0245671 A1 * | 9/2014 | Sritharan | ................ | F03D 80/70 52/173.1 |
| 2014/0356058 A1 * | 12/2014 | Lee | .......................... | E02D 5/34 403/301 |
| 2014/0360122 A1 * | 12/2014 | Oros | ......................... | F16B 3/00 52/590.1 |
| 2017/0058550 A1 * | 3/2017 | Stevens | ................... | E04H 12/20 |
| 2017/0292275 A1 * | 10/2017 | Taylia | ................. | E04F 13/0894 |
| 2018/0187407 A1 * | 7/2018 | Mou | ....................... | E04B 1/58 |
| 2018/0202168 A1 * | 7/2018 | Stuart | ................. | E04F 13/0803 |
| 2018/0245329 A1 * | 8/2018 | Yu | ........................ | E04B 1/2403 |

FOREIGN PATENT DOCUMENTS

| | | |
|---|---|---|
| CN | 205024965 U | 2/2016 |
| CN | 105587040 A | 5/2016 |
| CN | 105735471 A | 7/2016 |
| CN | 106088334 A | 11/2016 |
| CN | 205777098 U | 12/2016 |
| DE | 2421640 B1 | 9/1975 |
| JP | S62160338 A | 7/1987 |
| JP | H04258447 A | 9/1992 |
| JP | H10331263 A | 12/1998 |
| KR | 20090105512 A | 10/2009 |
| KR | 20130074281 A | 7/2013 |
| WO | 2009150588 A3 | 2/2010 |

* cited by examiner

ASSEMBLABLE STRUCTURAL COLUMN JOINT CONNECTION USING FIBER-REINFORCED CONCRETE FILLED ROUND DOUBLE STEEL TUBES AND MOUNTING METHOD THEREOF

CROSS-REFERENCE TO RELATED APPLICATIONS

This application is a continuation of International Patent Application No. PCT/CN2017/081968, filed on Apr. 26, 2017, which claims the benefit of priority from Chinese Application No. 201710100604.7, filed on Feb. 23, 2017. The content of the aforementioned applications, including any intervening amendments thereto, are incorporated herein by reference.

TECHNICAL FIELD

The present disclosure relates to structural engineering, and more particularly to an assemblable structural column joint connection using fiber-reinforced concrete filled round double steel tubes and a mounting method thereof.

BACKGROUND OF THE INVENTION

Due to the oversupply of the steel, assembled steel structure constructions are encouraged in China, and high-strength steel is widely used in building structures from which the industrialization of constructions benefits. This is conductive to the improvement of production efficiency, energy saving, environment-friendly buildings, and achievement of improved quality of construction projects. The assembled steel structure buildings contribute to green constructions, because the fabricated construction can meet the requirements for green construction. For example, it can save land, energy, materials and water, and is environmentally friendly, thereby reducing the negative impact on environment and achieving sustainable development.

When the relatively large deformation is generated in an ordinary high-strength concrete-filled round steel tube or steel reinforced concrete, cracking may occur at the concrete filled in the high-strength round steel tube or steel bar. Subsequently, a local buckling of the steel tube or the steel bar occurs, causing a damage to the structure. However, for fiber-reinforced concrete-filled round double steel tubes, there is a large contact area between the inner and outer round steel tubes and the fiber-reinforced concrete filled therein, and the attachment therebetween is tight, thereby achieving a better integrity. Moreover, due to an interaction between the inner and outer steel tubes and the fiber-reinforced concrete filled therein, an ultimate stress of the fiber-reinforced concrete increases, and the local buckling of the inner and outer round steel tubes is limited, so that the deformation resistance and bearing capacity of the fiber-reinforced concrete filled high-strength round double steel tubes are obviously improved.

Since the ordinary high-strength concrete-filled round steel tube or steel reinforced concrete need to meet the requirement for structural integrity, a complex process is required at the joint of components to ensure a reliability of the joint connections, causing inconvenience to the construction of the assembled steel structures. In general, the high-strength steel has higher requirements in welding quality and is more difficult in welding technique than the ordinary steel. In practice, welding for steel tubes is often completed in situ, so that the welding at weld is affected by the construction environment and the skill level of the operators. Therefore, the welding quality cannot be fully guaranteed, resulting in a negative impact on the stability and reliability of the structure. In addition, construction time will be extended because of the on-site welding process, so that the project cost is increased.

SUMMARY OF THE INVENTION

The main objective of the present invention is to provide an assemblable structural column joint connection using fiber-reinforced concrete filled round double steel tubes to solve the problems of poor structural stability and reliability due to welding quality problems of the joint connections using fiber-reinforced concrete filled round double steel tubes in the prior art.

To achieve the above objective, the present invention adopts the following technical solutions.

The present application provides an assemblable structural column joint connection using fiber-reinforced concrete filled round double steel tubes, comprising an outer high-strength round steel tube, an inner high-strength round steel tube and a round separation plate. The inner high-strength round steel tube is provided in the outer high-strength round steel tube, and is concentric with the outer high-strength round steel tube.

A plurality of wedge-shaped teeth are provided at both the outer high-strength round steel tube and the inner high-strength steel tube, and the plurality of wedge-shaped teeth spaced are uniformly distributed along circumferences of the inner high-strength round steel tube and the outer high-strength round steel tube.

The round separation plate comprises a round plate provided with a central through-hole.

A plurality of vertical separation walls corresponding to the plurality of wedge-shaped teeth are provided on upper and lower surfaces of the round plate. The plurality of vertical separation walls comprise a first vertical separation wall fitted with the inner high-strength round steel tube and a second vertical separation wall fitted with the outer high-strength round steel tube, so that the outer high-strength round steel tube and the inner high-strength round steel tube are fixedly connected to the round separation plate. Each of the first and second vertical separation walls comprises at least one vertical separation wall that is provided with a plurality of wedge-shaped sliding grooves matching the plurality of wedge-shaped teeth.

Further, the wedge-shaped teeth are arranged on inner and outer sides of both the inner high-strength round steel tube and the outer high-strength round steel tube.

Further, each vertical separation wall comprises two opposite walls on which the plurality of wedge-shaped sliding grooves are provided to engage with the plurality of wedge-shaped teeth.

Further, a crescent through-hole is provided on the round separation plate and is configured for pouring concrete.

Further, two or three groups of the wedge-shaped teeth are uniformly distributed along the circumferences of the inner high-strength round steel tube and the outer high-strength round steel tube.

Further, an external reinforcement ring is welded on an outer side of the outer high-strength round steel tube, and is connected to a steel girder via welding or bolts.

The present application provides a method for mounting the assemblable structural column joint connection using fiber-reinforced concrete filled round double steel tubes, comprising the following steps:

step 1: welding the wedge-shaped teeth at two sides of both the outer high-strength round steel tube and the inner high-strength round steel tube;

step 2: placing wedge-shaped teeth of the inner high-strength round steel tube in a gap between two opposite walls of the first vertical separation wall, aligning the wedge-shaped teeth with the wedge-shaped sliding grooves, and rotating the inner high-strength round steel tube such that the wedge-shaped teeth are engaged with the wedge-shaped sliding grooves in a snap fit;

step 3: placing the wedge-shaped teeth of the outer high-strength round steel tube in a gap between two opposite walls of the second vertical separation wall, aligning the wedge-shaped teeth with the wedge-shaped sliding grooves; and rotating the outer high-strength round steel tube such that the wedge-shaped teeth are engaged with the wedge-shaped sliding grooves in a snap fit;

step 4: pouring fiber-reinforced concrete into the outer high-strength round steel tube and the inner high-strength round steel tube through the central through-hole and the crescent through-hole;

step 5: welding the external reinforcement ring on the outer side of the outer high-strength round steel tube; and step 6: connecting the steel girder to the external reinforcement ring.

The present invention has the following advantages.

(1) The assemblable structural column joint connection of the present invention avoids the on-site welding between the high-strength round steel tubes, so that the reliability of the structural column joint connection is improved.

(2) All the steel parts of the structural column joint connection are manufactured in a factory and assembled on site, and the concrete is poured on site, which minimizes a bad impact of on-site construction on the construction quality.

(3) Cross-sections of the steel tube above and below the connection section can be adjusted by changing a spacing of the vertical separation walls on the round separation plate. It is not only suitable for connecting columns with a same cross-section, but also for connecting columns with different cross-sections.

Figure 1:
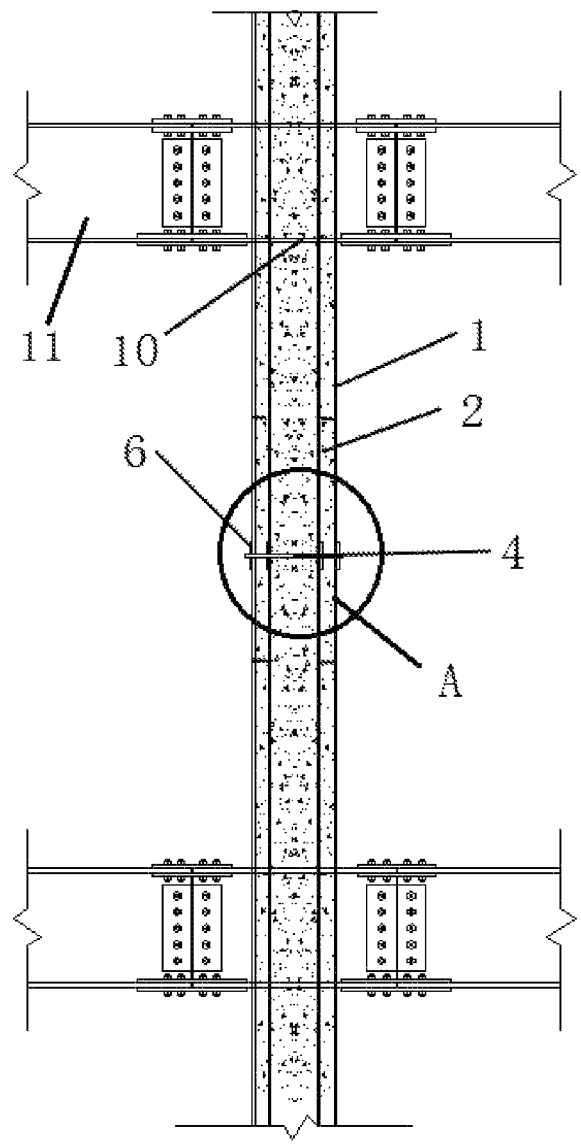
FIG. 1 is a schematic diagram of an assemblable structural column joint connection using fiber-reinforced concrete filled round double steel tubes of the present invention.

In the drawings: 1, outer high-strength round steel tube; 2, inner high-strength round steel tube; 3, wedge-shaped connection tooth; 4, round separation plate; 5, round plate; 6, vertical separation wall; 7, wedge-shaped sliding groove; 8, central through-hole; 9, crescent through-hole; 10, external reinforcement ring; 11, steel girder.

DETAILED DESCRIPTION OF EMBODIMENTS

The present invention will be further described in detail below with reference to the accompanying drawings.

Example 1

As shown in FIG. 1, an assemblable structural column joint connection using fiber-reinforced concrete filled round double steel tubes includes an outer high-strength round steel tube 1, an inner high-strength round steel tube 2 and a round separation plate 4. The inner high-strength round steel tube is provided in the outer high-strength round steel tube, and is concentric with the outer high-strength round steel tube. The round separation plate connects upper and lower fiber-reinforced concrete filled double steel tubes. An external reinforcement ring 10 is welded on an outer side of the outer high-strength round steel tube, and is connected to a steel girder 11 via welding or bolts.

Figure 2:
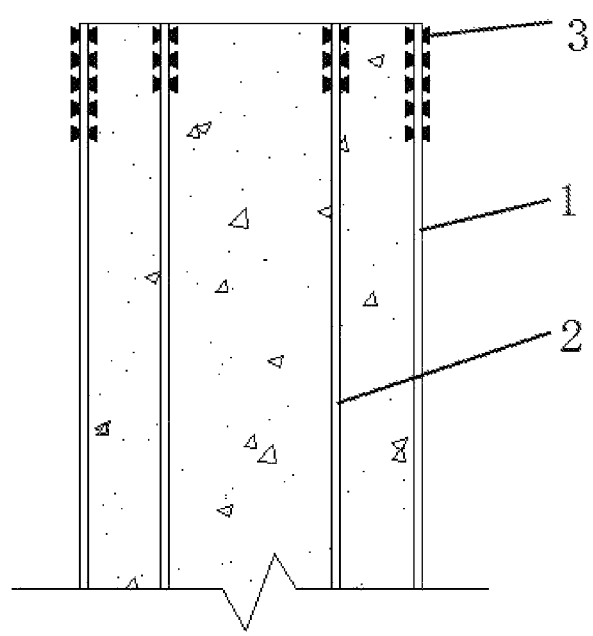
FIG. 2 is a schematic diagram of an end of a fiber-reinforced concrete filled round double steel tubes.
Figure 6:
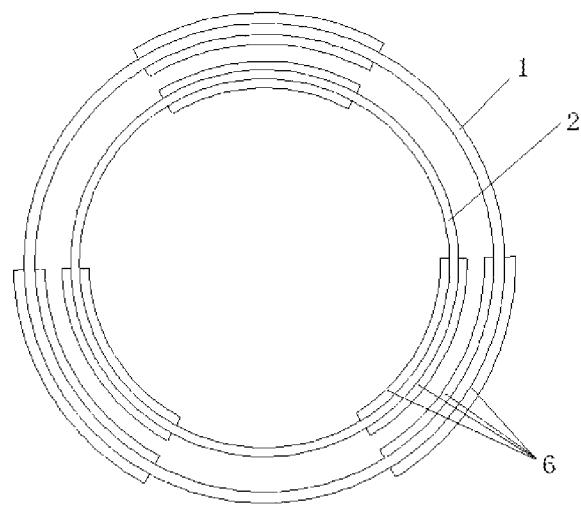
FIG. 6 is a schematic diagram showing the distribution of vertical separation walls according to a first embodiment of the present invention.

As shown in FIG. 2, a plurality of wedge-shaped teeth 3 are provided at two sides of both the outer high-strength round steel tube and the inner high-strength steel tube. The wedge-shaped teeth are welded at the sides of both the inner high-strength round steel tube and the outer high-strength round steel tube, and the wedge-shaped teeth spaced are uniformly distributed along circumferences of the inner high-strength round steel tube and the outer high-strength round steel tube. As shown in FIG. 6, three groups of wedge-shaped teeth are provided on sides of the inner high-strength round steel tube and the outer high-strength round steel tube. A central angle of each group of the wedge-shaped teeth is 60 degree, and an angle between two groups of the wedge-shaped teeth is 60 degree.

Figure 3:
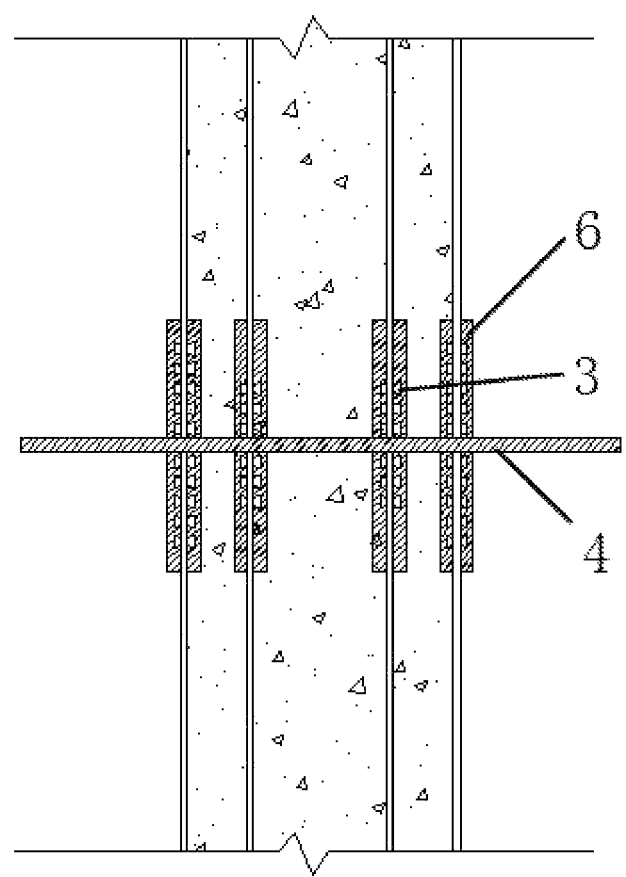
FIG. 3 is a partial enlarged view of A in FIG. 1.
Figure 4:
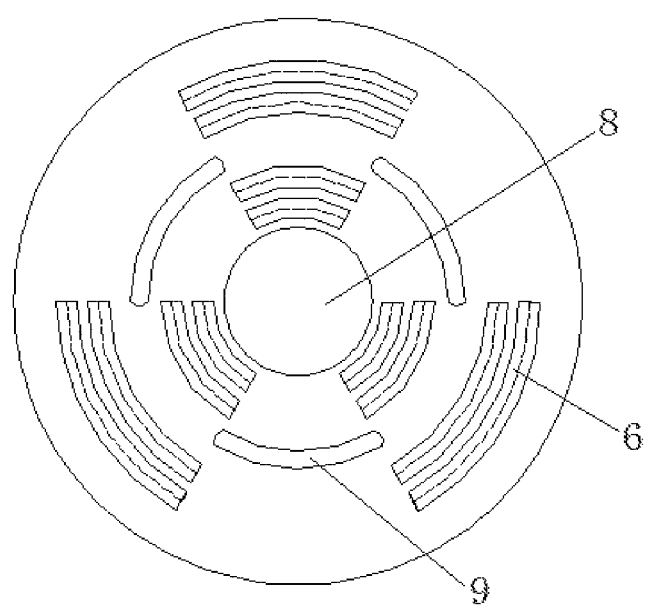
FIG. 4 is a plan view of a round separation plate.
Figure 5:
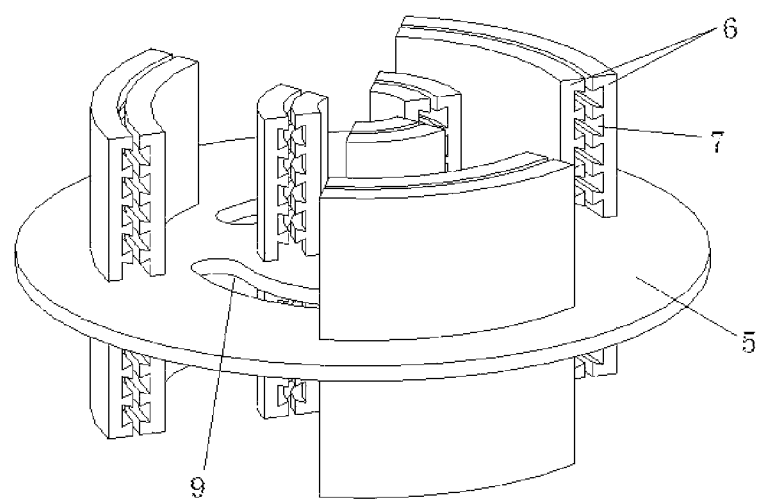
FIG. 5 is a perspective view of the round separation plate.

As shown in FIGS. 4 and 5, the round separation plate includes a round plate 5. A central through-hole 8 and a crescent through-hole 9 are provided at the round plate. Vertical separation walls 6 are provided at upper and lower surfaces of the round plate. As shown in FIG. 3, the vertical separation walls include a first vertical separation wall fitted with the inner high-strength round steel tube and a second vertical separation wall fitted with the outer high-strength round steel tube, so that the outer high-strength round steel tube and the inner high-strength round steel tube are fixedly connected to the round separation plate. There are at least one first vertical separation wall and at least one second vertical separation wall which are provided with a plurality of wedge-shaped sliding grooves 7 matching the wedge-shaped teeth.

During mounting, the wedge-shaped teeth of the inner high-strength round steel tube are placed in a gap between two vertical separation walls, and the wedge-shaped teeth are aligned with the wedge-shaped sliding grooves. Then, the inner high-strength round steel tube is rotated such that the wedge-shaped teeth are engaged with the wedge-shaped sliding grooves in a snap fit. The outer high-strength round steel tube is mounted in a same way as the inner high-strength round steel tube. Therefore, the distribution of vertical separator plates corresponds to the wedge-shaped teeth.

When the wedge-shaped teeth are disposed on either the inner side or the outer side of the steel tubes, each vertical separation wall requires only one part. When the wedge-shaped teeth are disposed on both the inner side and the outer side of the steel tubes, each vertical separation wall requires two parts. The wedge-shaped sliding grooves are arranged on two opposite walls of the vertical separation wall to match the wedge-shaped teeth. The connection between the wedge-shaped sliding grooves and the wedge-shaped teeth ensures the bearing capacity and reliability of the connection section, which is suitable for structures with higher requirements for bearing capacity.

The present invention is not only suitable for connecting columns with a same cross-section, but also for connecting columns with different cross-sections. If the round separation plate connects two identical fiber-reinforced concrete filled round double steel tubes, the vertical separation walls on the upper and lower surfaces of the round separation plate have a same distribution. If the upper and the lower fiber-reinforced concrete filled round double-tube steel tubes have different cross-sections, diameters of the vertical separation walls can accordingly be changed.

The method for mounting the assemblable structural column joint connection using fiber-reinforced concrete filled round double steel tubes includes the following steps.

Step 1: The wedge-shaped teeth are welded on two sides of both the outer high-strength round steel tube and the inner high-strength round steel tube.

Step 2: The wedge-shaped teeth of the inner high-strength round steel tube are placed in a gap between two opposite walls of the first vertical separation wall, and the wedge-shaped teeth are aligned with the wedge-shaped sliding grooves. Then, the inner high-strength round steel tube are rotated such that the wedge-shaped teeth are engaged with the wedge-shaped sliding grooves in a snap fit.

Step 3: The wedge-shaped teeth of the outer high-strength round steel tube are placed in a gap between two opposite walls of the second first vertical separation wall, and the wedge-shaped teeth are aligned with the wedge-shaped sliding grooves. Then, the outer high-strength round steel tube are rotated such that the wedge-shaped teeth are engaged with the wedge-shaped sliding grooves in a snap fit.

Step 4: The fiber-reinforced concrete is poured into the outer high-strength round steel tube and the inner high-strength round steel tube through the central through-hole and the crescent through-hole.

Step 5: The external reinforcement ring are welded on the outer side of the outer high-strength round steel tube.

Step 6: The steel girder are connected to the external reinforcement ring.

Example 2

Figure 7:
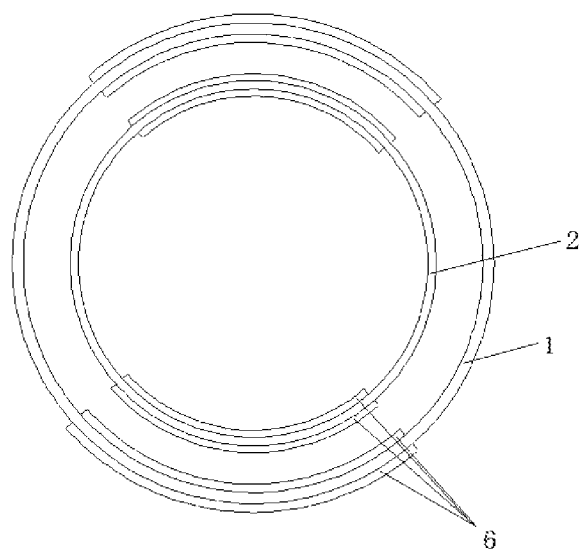
FIG. 7 is a schematic diagram showing the distribution of the vertical separation walls according to a second embodiment of the present invention.

As shown in FIG. 7, the differences between the present example and Example 1 are that two groups of the wedge-shaped teeth are provided on each side of the steel tubes, and a central angle of each group of the wedge-shaped teeth is 90 degree, and an angle between two groups of the wedge-shaped teeth is 90 degree. The rest is the same as in Example 1.

The above is only some preferred embodiments of the present invention, and is not intended to limit the present invention. Variants and modifications may be made by those skilled in the art. Any modifications, equivalent substitutions and improvements within the spirit and principle of the present invention shall fall into the scope of the present invention.

What is claimed is:

1. An assemblable structural column joint connection, comprising:
   an outer round steel tube,
   an inner round steel tube, and
   a round separation plate;
   wherein:
   the inner round steel tube is provided in the outer round steel tube, and is concentric with the outer round steel tube;
   a plurality of dove-tail teeth are provided at both the outer round steel tube and the inner round steel tube, and the plurality of dove-tail teeth spaced are uniformly distributed along circumferences of the inner round steel tube and the outer round steel tube;
   the round separation plate comprises a round plate provided with a central through-hole;
   a plurality of vertical separation walls corresponding to the plurality of dove-tail teeth are provided on upper and lower surfaces of the round plate; the plurality of vertical separation walls comprise a first vertical separation wall fitted with the inner round steel tube and a second vertical separation wall fitted with the outer round steel tube, so that the outer round steel tube and the inner round steel tube are fixedly connected to the round separation plate; and a plurality of dove-tail sliding grooves for matching the plurality of dove-tail teeth are provided on the plurality of vertical separation walls.

2. The assemblable structural column joint connection of claim 1, wherein the dove-tail teeth are arranged on inner and outer sides of both the outer round steel tube and the inner round steel tube.

3. The assemblable structural column joint connection of claim 1, wherein each vertical separation wall comprises two opposite walls on which the plurality of dove-tail sliding grooves are provided to engage with the plurality of dove-tail teeth.

4. The assemblable structural column joint connection of claim 1, wherein a crescent through-hole is provided on the round separation plate and is configured for pouring concrete.

5. The assemblable structural column joint connection of claim 1, wherein two or three groups of the dove-tail teeth are uniformly distributed along the circumferences of the inner round steel tube and the outer round steel tube.

6. The assemblable structural column joint connection of claim 1, wherein an external reinforcement ring is welded on an outer side of the outer round steel tube, and is connected to a steel girder via welding or bolts.

* * * * *